US012115801B2

(12) United States Patent
Akahane et al.

(10) Patent No.: US 12,115,801 B2
(45) Date of Patent: Oct. 15, 2024

(54) RECORDING APPARATUS

(71) Applicant: SEIKO EPSON CORPORATION, Tokyo (JP)

(72) Inventors: Hisayuki Akahane, Matsumoto (JP); Nobuhisa Nomoto, Matsumoto (JP); Satoru Orii, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 298 days.

(21) Appl. No.: 17/189,668

(22) Filed: Mar. 2, 2021

(65) Prior Publication Data

US 2021/0276352 A1 Sep. 9, 2021

(30) Foreign Application Priority Data

Mar. 5, 2020 (JP) ................................ 2020-037836

(51) Int. Cl.
*B41J 29/19* (2006.01)
*B65H 31/20* (2006.01)

(52) U.S. Cl.
CPC .............. *B41J 29/19* (2013.01); *B65H 31/20* (2013.01); *B65H 2701/1928* (2013.01)

(58) Field of Classification Search
CPC ... B65H 31/20; B65H 2701/1928; B41J 29/19
USPC .......................................................... 400/716
See application file for complete search history.

(56) References Cited

U.S. PATENT DOCUMENTS

| | | | | |
|---|---|---|---|---|
| 6,614,650 | B2 | 9/2003 | Tabata | |
| 8,575,581 | B2 * | 11/2013 | Murosaki | H04N 1/00681 250/559.07 |
| 9,944,489 | B2 * | 4/2018 | Arikawa | B65H 31/02 |
| 10,232,654 | B2 | 3/2019 | Shimizu et al. | |
| 10,419,629 | B2 * | 9/2019 | Sakuma | H04N 1/00535 |
| 2002/0127977 | A1 | 9/2002 | Tabata | |
| 2007/0009311 | A1 | 1/2007 | Niioka | |
| 2013/0050780 | A1 * | 2/2013 | Matsumoto | H04N 1/00631 358/475 |
| 2018/0126760 | A1 | 5/2018 | Shimizu et al. | |

FOREIGN PATENT DOCUMENTS

| | | | |
|---|---|---|---|
| CN | 111137725 A * | 5/2020 | B65H 26/00 |
| JP | H08-339107 A | 12/1996 | |
| JP | 2001-075322 | 3/2001 | |
| JP | 2002-271456 | 9/2002 | |
| JP | 2007-237426 | 9/2007 | |
| JP | 2007-286333 | 11/2007 | |
| JP | 2016-196108 | 11/2016 | |
| JP | 2018-075759 | 5/2018 | |

* cited by examiner

*Primary Examiner* — Patrick Cicchino
(74) *Attorney, Agent, or Firm* — WORKMAN NYDEGGER

(57) ABSTRACT

A recording apparatus includes a recording section configured to perform recording onto a medium, a facing section facing a recording surface of a medium at a discharge position where the medium recorded by the recording section is discharged, and a light emitter configured to emit light toward the recording surface. The facing section includes an optical member disposed at a position where the light emitted by the light emitter enters, the optical member being configured to pass the incident light toward at least the recording surface.

18 Claims, 8 Drawing Sheets

RECORDING APPARATUS

The present application is based on, and claims priority from JP Application Serial Number 2020-037836, filed Mar. 5, 2020, the disclosure of which is hereby incorporated by reference herein in its entirety.

BACKGROUND

1. Technical Field

The present disclosure relates to a recording apparatus for performing recording on a medium.

2. Related Art

Some recording apparatuses such as facsimile machines and printers discharge a recorded sheet toward a sheet discharging space in their housings. Because the sheet discharging space is dark, some known recording apparatuses have a lamp for illuminating the sheet discharging space, for example, as described in JP-A-8-339107. In the structure in JP-A-8-339107, in response to a discharge of a sheet onto a tray, a lamp on the ceiling light up, enabling the user to readily check and remove the discharged sheet or to become aware of the sheet discharge.

In some cases, users may want to check immediately the recording results, in particular, a user who started high-quality photo printing may want to check immediately and rigorously the recording quality during the printing whether the recording results have satisfied a desired quality. In another case, in particular, when a user uses a serial printer, if a user checks immediately the recording quality and finds that the recording quality is unsatisfying, then, the user can stop the recording to avoid ink wasting. In the structure described in JP-A-8-339107, however, the lamp on the ceiling is provided merely to ease the check and removal of discharged sheets and the structure fails to fully satisfy the need for quick and rigorous check of the recording results before the completion of the recording.

SUMMARY

According to an aspect of the present disclosure, a recording apparatus for solving the above mentioned problem includes a recording section configured to perform recording onto a medium, a facing section facing a recording surface of a medium at a discharge areas where the medium recorded by the recording section is discharged, and a light emitter configured to emit light toward the recording surface. The facing section includes an optical member disposed at a position where the light emitted by the light emitter enters, the optical member being configured to pass the incident light toward at least the recording surface.

DESCRIPTION OF EXEMPLARY EMBODIMENTS

Figure 1:
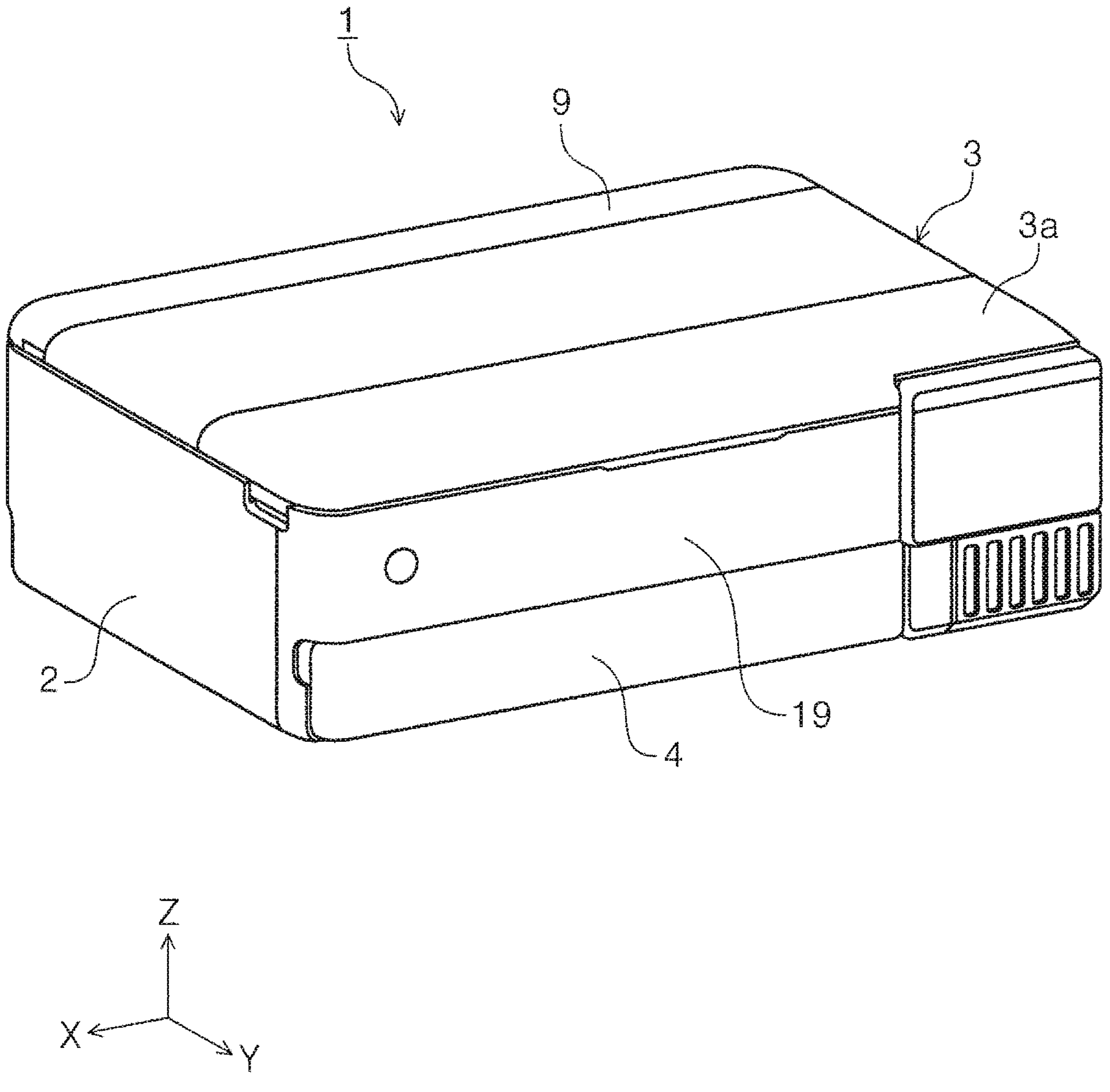
FIG. 1 is a perspective view illustrating a printer with a retracted sheet receiving tray.

Hereinafter, an overview of the present disclosure will be described. A recording apparatus according to a first aspect includes a recording section configured to perform recording onto a medium, a facing section facing a recording surface of a medium at a discharge areas where the medium recorded by the recording section is discharged, and a light emitter configured to emit light toward the recording surface. The facing section includes an optical member disposed at a position where the light emitted by the light emitter enters, the optical member being configured to pass the incident light toward at least the recording surface.

According to the aspect, a facing section facing a recording surface of a medium at a discharge areas where the medium recorded by the recording section is discharged includes an optical member disposed at a position where the light emitted by the light emitter enters and the optical member is configured to pass the incident light toward at least the recording surface. Consequently, recording results can be checked immediately, that is, before the recording is completed, and also clearly and visually checked. As a result, user needs can be appropriately satisfied.

According to a second aspect, in the first aspect, an irradiation area on the recording surface irradiated by the optical member may have a width that covers the entire recording surface of a first-size medium in a medium width direction that is a direction orthogonal to a direction in which the medium is transported. According to the aspect, an irradiation area on the recording surface irradiated by the optical member has a width that covers the entire recording surface of a first-size medium in a medium width direction that is a direction orthogonal to a direction in which the medium is transported. Accordingly, the entire recording surface in the medium width direction can be irradiated, and thereby the recording results can be more appropriately visually checked.

According to a third aspect, in the first or second aspect, the optical member may have an optically transparent ground-glass surface that is disposed to face the recording surface. According to the aspect, the optical member has an optically transparent ground-glass surface that is disposed to face the recording surface, and thus the light emitted by the light emitter can be diverged over a wide area.

According to a fourth aspect, in the first or second aspect, the optical member may contain a light-diffusing agent and have optical transparency. According to the aspect, the optical member contains a light-diffusing agent and has optical transparency. Consequently, the light emitted by the light emitter can be diverged over a wide area.

According to a fifth aspect, in any one of the first to fourth aspects, a space between the recording surface and the optical member in the direction orthogonal to the recording surface may be 30 mm or less. According to the aspect, a space between the recording surface and the optical member in the direction orthogonal to the recording surface is 30 mm or less. Consequently, the recording results can be clearly visually checked at the sheet discharge areas.

According to a sixth aspect, in any one of the first to fifth aspects, a pair of reflective sheets may be disposed on both sides of an optical path of the light emitted by the light emitter toward the optical member. According to the aspect, a pair of reflective sheets are disposed on both sides of an optical path of the light emitted by the light emitter toward the optical member, and thus the quantity of light emitted by the optical member toward the recording surface can be ensured.

According to a seventh aspect, in the sixth aspect, a shading sheet may be disposed between the reflective sheet of the pair of reflective sheets on a side close to a wall of a front of the apparatus and the wall. According to the aspect, a shading sheet is disposed between the reflective sheet of the pair of reflective sheets on a side close to a wall of a front of the apparatus and the wall. Consequently, leakage of light from the wall toward the apparatus front can be suppressed.

According to an eighth aspect, in any one of the first to seventh aspects, the light emitter may light up at least from a time when a leading edge of the medium reaches a position where the leading edge faces the facing section to a time when a trailing edge of the medium passes through a position where the trailing edge faces the facing section. According to the aspect, the light emitter lights up at least from a time when a leading edge of the medium reaches a position where the leading edge faces the facing section to a time when a trailing edge of the medium passes through a position where the trailing edge faces the facing section. Consequently, the entire recording result can be appropriately visually checked.

According to a ninth aspect, in the eighth aspect, the recording apparatus may be configured to be switched between a first recording mode for performing recording at a first recording quality level to the medium and a second recording mode for performing recording at a level higher than the first recording quality level to the medium, and the light emitter may emit no light in the first recording mode and emit light in the second recording mode. According to the aspect, when the visual check of recording results is not so important, the light emitters emit no light, and thereby power saving can be achieved.

According to a tenth aspect, in any one of the first to ninth aspects, a tray on which a medium is to be set, the tray being configured to be inserted upstream in a medium transport path from an apparatus front may be provided and a detector configured to detect insertion of the tray to a position at which the tray is transported may be provided. When the detector detects insertion of the tray to the position at which the tray is transported, the lighting state of the light emitter may change.

According to the aspect, when the detector detects insertion of the tray to the position at which the tray is transported, the lighting state of the light emitter changes. Consequently, by using the light emitter, the user can understand that the tray has reached the position at which the tray can be transported, and thus the usability of the user can be increased.

According to an eleventh aspect, in any one of the first to ninth aspects, a medium receiving tray configured to be switched by the power of a motor to a retracted state in which the medium receiving tray is retracted in an apparatus body including the recording section or to an extended state in which the medium receiving tray is extended to the maximum from the apparatus body, and configured to receive the medium discharged to the outside of the apparatus body in the extended state or while the medium receiving tray is extended from the apparatus body from the retracted state to the extended state may be provided. When the medium receiving tray is moved from the retracted state to the extended state, the light emitter may emit light.

Hereinafter, an embodiment of the present disclosure will be described. In the drawings, a direction in an X axis denotes an apparatus width direction and a direction intersecting a sheet transport direction in which a paper sheet, which is an example medium, is transported, that is, a sheet width direction. A −X direction denotes a right direction when viewed from a user who is facing an apparatus front, and a +X direction denotes a left direction. A Y-axis direction denotes an apparatus depth direction. A +Y direction denotes a direction from an apparatus rear toward the apparatus front, and a −Y direction denotes a direction from the apparatus front toward the apparatus rear. The +Y direction corresponds to a sheet discharging direction in which a recorded sheet is discharged through a discharge slot 17. In this embodiment, a side surface on which a front cover 4 is provided among side surfaces of the apparatus is referred to as the apparatus front. A direction in a Z axis denotes a vertical direction. A +Z direction denotes vertically upward, and a −Z direction denotes vertically downward. In the description below, a direction toward which a medium is transported may be referred to as "downstream" and the opposite direction may be referred to as "upstream".

Figure 2:
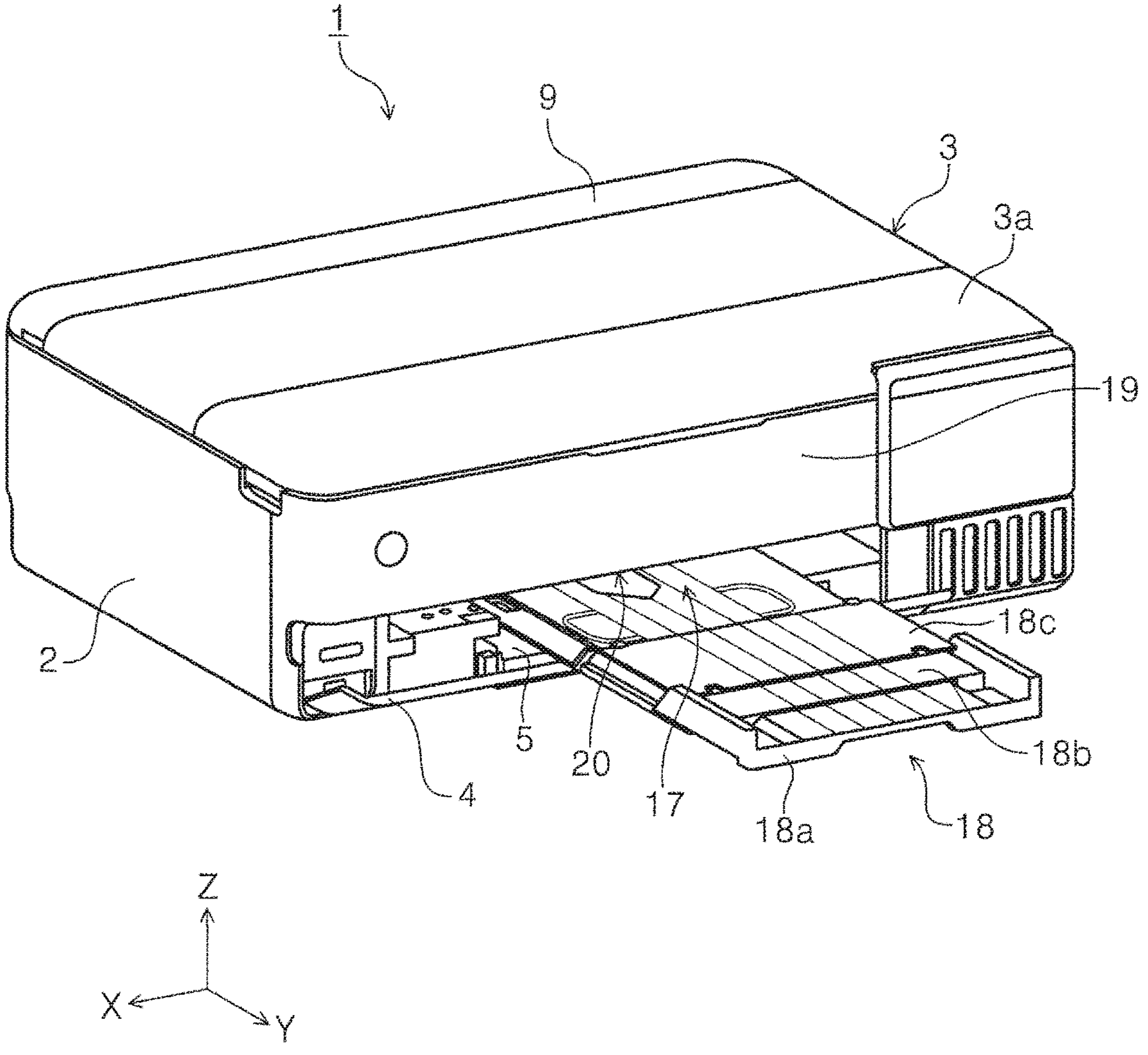
FIG. 2 is a perspective view illustrating a printer with an extended sheet receiving tray.

In FIG. 1 and FIG. 2, an ink jet printer 1, which is an example recording apparatus, is a multifunction peripheral that includes a scanner section 3 that is disposed in an upper part of an apparatus body 2. Hereinafter, the ink jet printer 1 is simply referred to as a "printer 1". The scanner section 3 can be turned with respect to the apparatus body 2 to a closed position as illustrated in FIG. 1 or to an open position (not illustrated). The scanner section 3 includes a document cover 3*a* for opening or closing a document positioning plate 3*b* (see FIG. 3).

Figure 3:
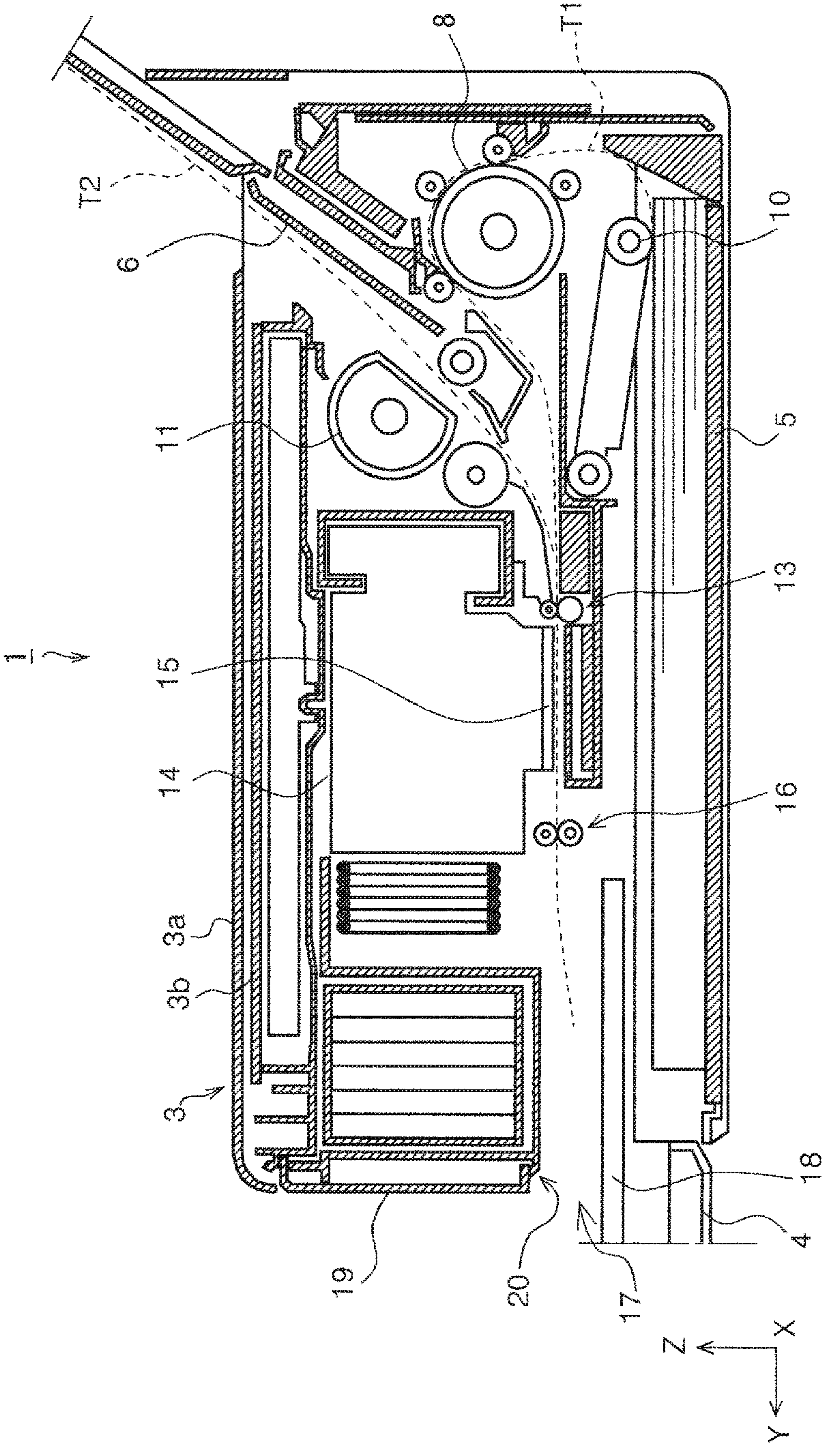
FIG. 3 illustrates a sheet transport path in a printer.

On an upper part of the apparatus body 2, on the rear side with respect to the document cover 3*a*, a top cover 9 is disposed. When the top cover 9 is opened, sheets can be set onto a hopper 6 as illustrated in FIG. 3. The sheets set on the hopper 6 come into contact with a feed roller 11 as the hopper 6 moves upward and the sheets are fed downstream by the rotation of the feed roller 11. Reference numeral T2 in FIG. 3 denotes a path along which sheets fed from the hopper 6 are transported.

Returning to FIG. 1 and FIG. 2, in a lower part of the apparatus body 2, on the front side, the front cover 4 is disposed. The front cover 4 can be turned to a closed position as illustrated in FIG. 1 or to an open position as illustrated in FIG. 2 and FIG. 3 with respect to a lower feed tray 5 that is disposed in a lower part of the apparatus body 2. When the front cover 4 is opened, the discharge slot 17 through which recorded sheets are discharged appears and also a sheet receiving tray 18 that receives sheets discharged through the discharge slot 17 appears.

When the sheet receiving tray 18 receives the power of a motor (37), the sheet receiving tray 18 can be switched to a retracted state in which the sheet receiving tray 18 is retracted into the apparatus body 2 or an extended state in which the sheet receiving tray 18 is ejected and extended from the apparatus body 2 as illustrated in FIG. 2 and FIG. 3. The sheet receiving tray 18 according to the embodiment includes a first tray 18*c*, a second tray 18*b*, and a third tray 18*a*. The second tray 18*b* can be extended further than the first tray 18*c* in the +Y direction in an extended state. The third tray 18*a* can be extended further than the second tray 18*b* in the +Y direction in an extended state. The sheet receiving tray 18 can receive a discharged sheet while the sheet receiving tray 18 is moving from the retracted state to the extended state.

Hereinafter, the sheet transport path will be described with reference to FIG. 3. Sheets that are stored in the lower feed tray 5, which is disposed in the lower part of the apparatus body 2, are fed by a feed roller 10 in the −Y direction. Reference numeral T1 denotes a path along which sheets fed from the lower feed tray 5 are transported. A reversing roller 8 is disposed above the feed roller 10. A sheet that is fed from the lower feed tray 5 or the hopper 6 receives a feeding force from the reversing roller 8 and is fed toward a transport roller pair 13 that is disposed on the +Y direction side with respect to the reversing roller 8. The sheet is transported by the transport roller pair 13 toward an area that faces a recording head 15, that is, a recording area.

The recording head 15, which is an example recording section, is disposed on a carriage 14. The carriage 14 is powered by a power source (not illustrated) to reciprocate in the X-axis direction. The recording head 15 discharges an ink onto a sheet as the carriage 14 moves. The recorded sheet is discharged by a discharging roller pair 16 toward the sheet receiving tray 18.

Now, the discharge slot 17 will be described. The discharge slot 17 corresponds to a sheet discharge position in which a sheet on which recording has been performed by the recording head 15 is discharged in the Y-axis direction. An upper side of the discharge slot 17 is a facing section 20 that faces a recording surface of a recorded sheet.

Figure 4:
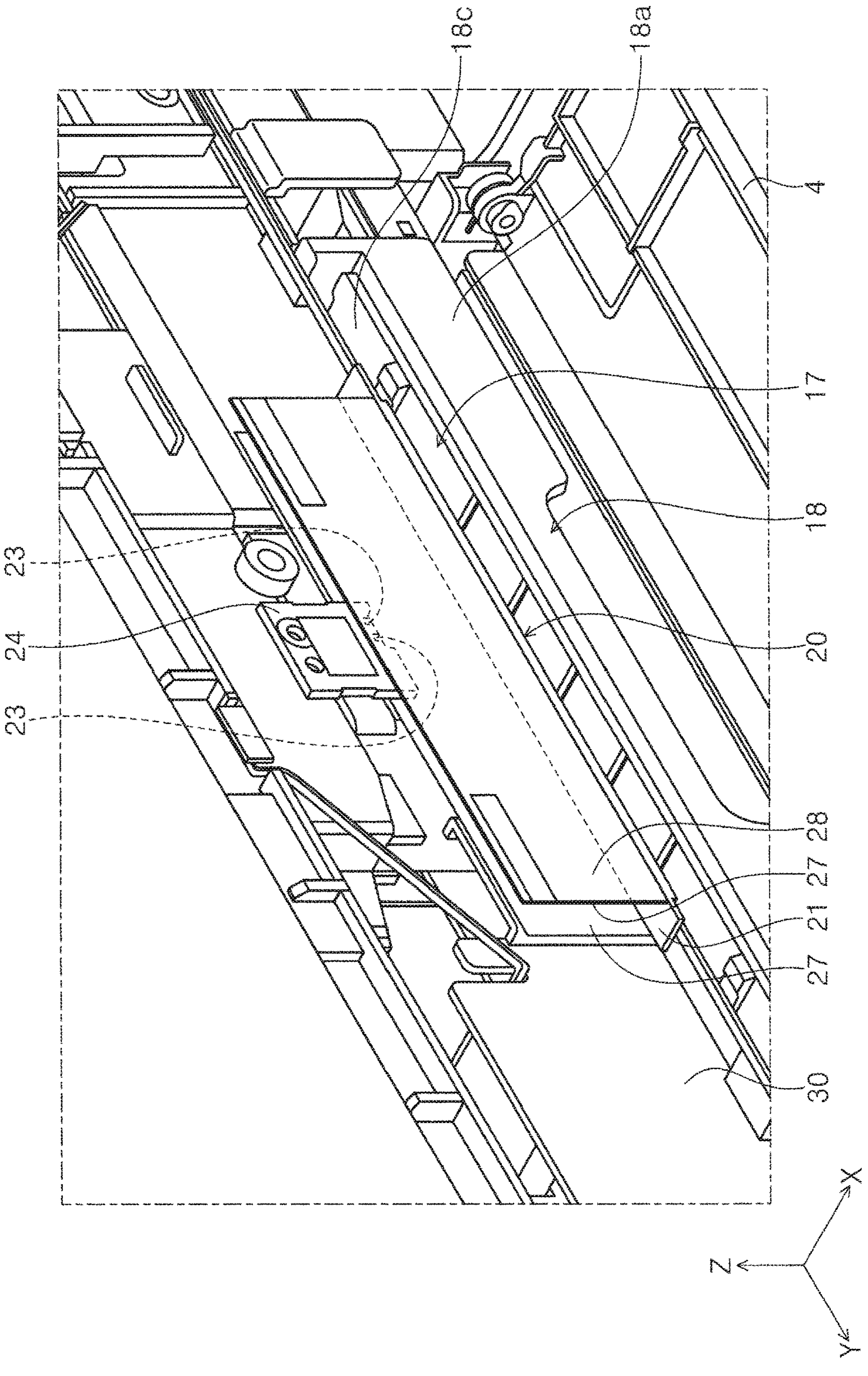
FIG. 4 is a partial enlarged perspective view of a front of a printer in which a front cover is removed to expose a plate.
Figure 5:
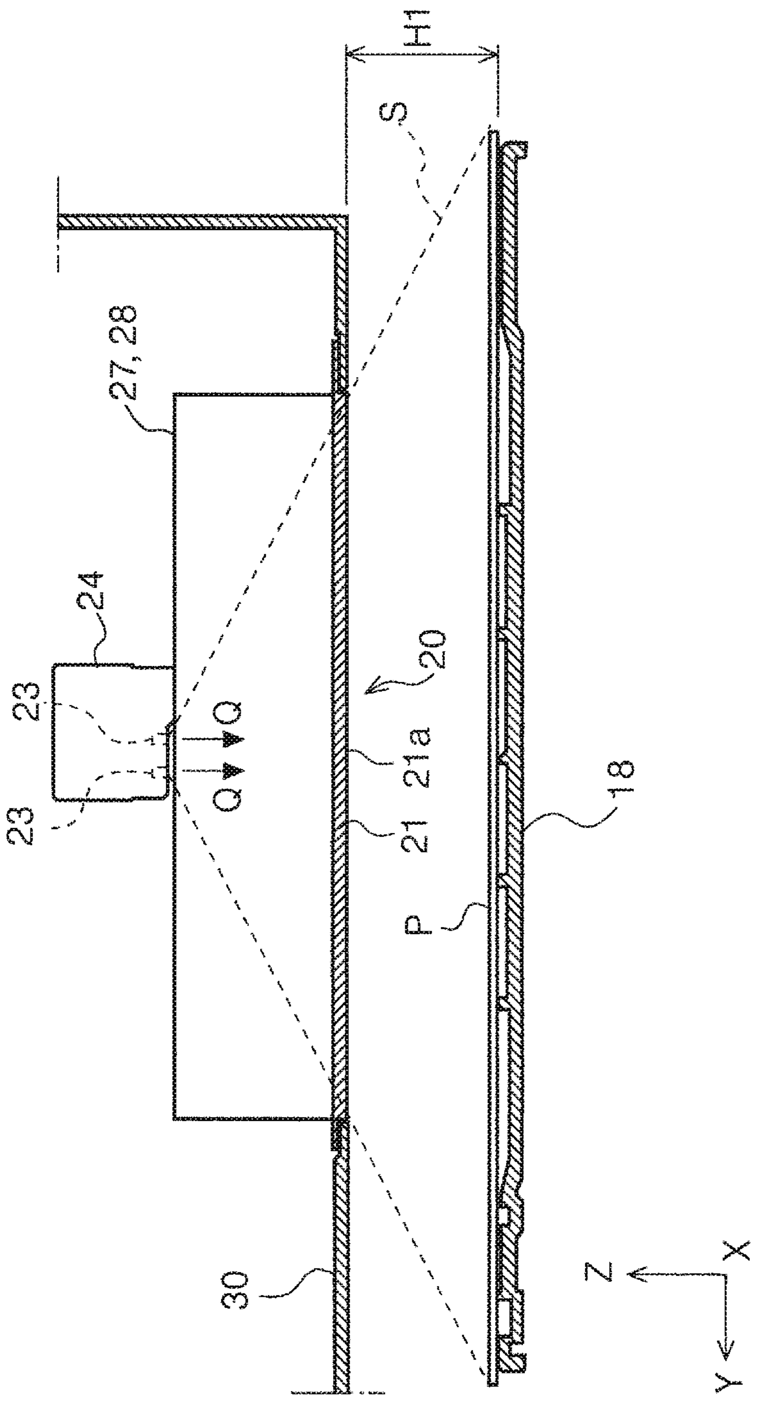
FIG. 5 illustrates an area irradiated by light emitters viewed in a sheet discharging direction.
Figure 6:
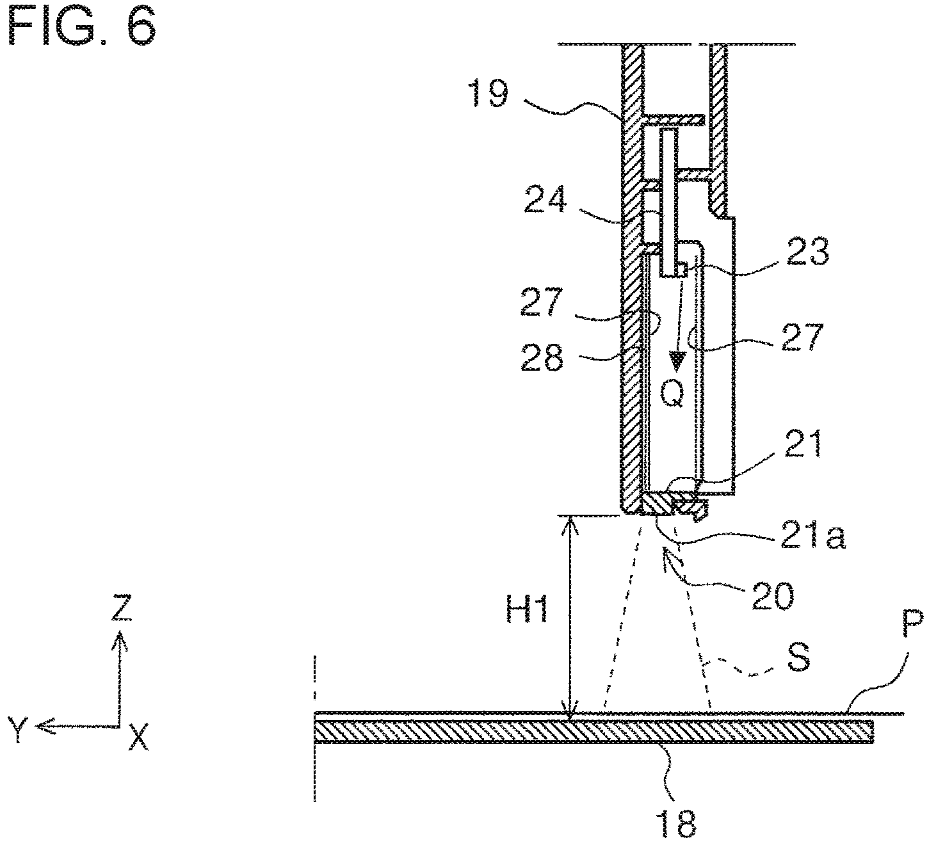
FIG. 6 illustrates an area irradiated by light emitters viewed in a sheet width direction.

The facing section 20 includes an optical member 21 as illustrated in FIG. 4 to FIG. 6. In the X-axis direction, that is, in the sheet width direction, the optical member 21 is attached to a frame 30 so as to be in a central part of an area where a sheet passes. More specifically, a center position of a discharged sheet in the sheet width direction substantially corresponds to a center position of the optical member 21 in the X-axis direction.

The optical member 21 is made of a material that has optical transparency and functions as a lens. The optical member 21 according to the embodiment is made of a colorless transparent resin material and has a facing surface 21*a* that is a ground-glass surface that faces a recording surface of a sheet.

Light emitters 23 are disposed on the +Z-direction side with respect to the optical member 21. Each of the light emitters 23 according to the embodiment is a white light-emitting diode (LED). In this embodiment, two light emitters 23 are disposed on a plate 24 with a space in the X-axis direction, that is, the sheet width direction. The two light emitters 23 are symmetric with respect to the center position of the optical member 21 in the X-axis direction, that is, in the sheet width direction.

Each of the light emitter 23 emits light to the optical member 21 in a direction indicated by arrow Q in FIG. 5 and FIG. 6. More specifically, the optical member 21 is disposed at a position where the light emitted from the light emitters 23 enters. Through the optical member 21, the incident light passes toward a recording surface of a sheet. The light passes through the optical member 21 toward the recording surface of the sheet diverges in the sheet width direction as illustrated in FIG. 5 and in the sheet transport direction as illustrated in FIG. 6.

Reflective sheets 27 are disposed upstream and downstream in the sheet transport direction with respect to the optical path of the light emitted from the light emitters 23 as illustrated in FIG. 4 and FIG. 6. More specifically, a pair of reflective sheets 27 are disposed on both sides of the optical path of the light emitted from the light emitters 23. Each of the reflective sheets 27 extends from the position of the light emitter 23 to the upper surface of the optical member 21 in the Z-axis direction. In addition, each of the reflective sheets 27 covers a substantially entire area of the optical member 21 in the X-axis direction. The reflective sheet 27 may be made of, for example, a white sheet material.

A shading sheet 28 is disposed between the reflective sheet 27 on the side close to a front panel 19 and the front panel 19. The dimensions of the shading sheet 28 in the X-axis direction and the Z-axis direction are similar to those of the reflective sheet 27 in this embodiment. The shading sheet 28 may be made of, for example, a white sheet material.

FIG. 5 and FIG. 6 illustrate the sheet receiving tray 18 that is in an extended state as illustrated in FIG. 2 and onto the sheet receiving tray 18, an example A4-size paper sheet is discharged such that its short side corresponds to the sheet width direction. The A4-size paper sheet is an example first size medium. FIG. 5 and FIG. 6 illustrate an A4-size paper sheet P. FIG. 5 and FIG. 6 also illustrate an irradiation area S that is irradiated with the light from the optical member 21 toward the recording surface of the sheet.

The light emitted by the light emitters 23 and enters the optical member 21, which has the ground-glass facing surface 21*a*, is diverged in the optical member 21 in the sheet width direction, and travels toward the recording surface of the sheet. In this embodiment, the irradiation area has a width that covers the entire short side of the A4-size paper sheet P.

FIG. 5 and FIG. 6 illustrate a space H1 between the sheet receiving tray 18 and the optical member 21 in the Z-axis direction, that is, a direction that is orthogonal to the recording surface of the sheet. The space H1 may be, for example, 30 mm or less. Accordingly, the space between the recording surface of the sheet and the optical member 21 is 30 mm or less.

Figure 7:
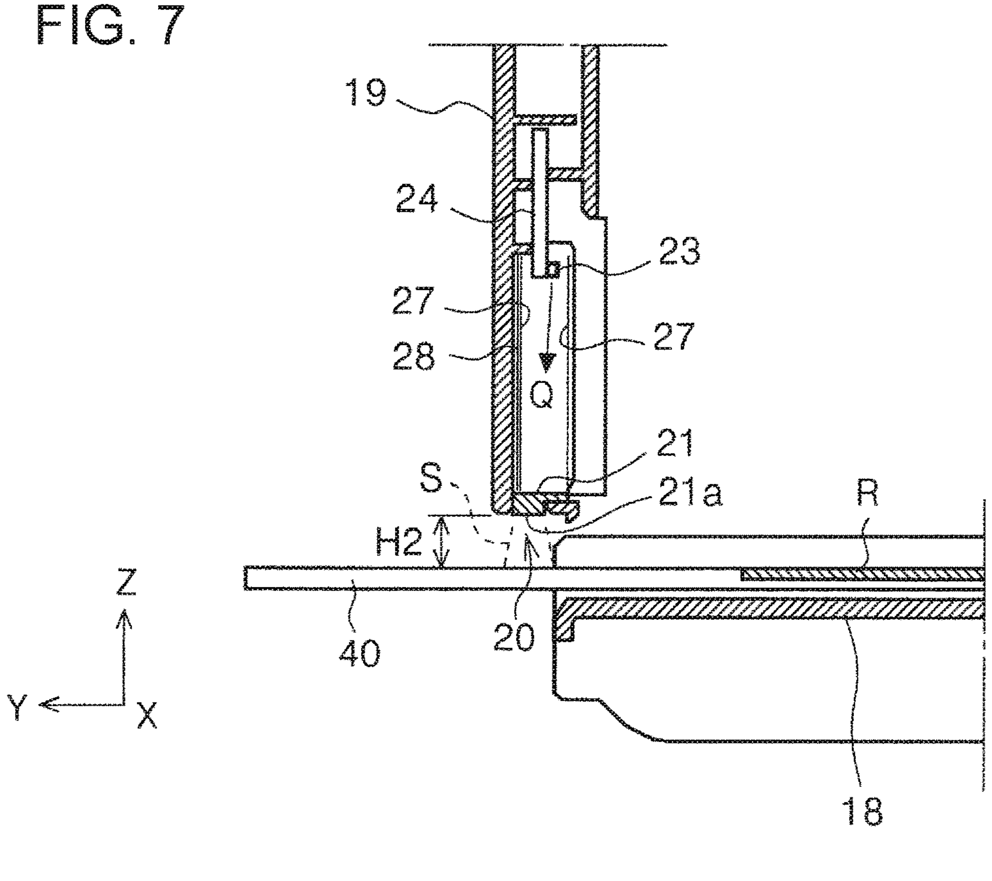
FIG. 7 illustrates an area irradiated by light emitters viewed in a sheet width direction.

The printer 1 according to the embodiment includes a tray on which an optical disc, which is an example medium, can be set, and the tray with the optical disc can be inserted upstream from the apparatus front side in the sheet transport path. FIG. 7 illustrates a tray 40 on which an optical disc R can be set. The tray 40 can be inserted upstream in the sheet transport path in a state in which the tray 40 is on the sheet receiving tray 18 that is in a retracted state. A −Y-direction end of the inserted tray 40 is nipped by the transport roller pair 13 (see FIG. 3) and the tray 40 is transported by the transport roller pair 13 in the −Y direction and then in the +Y direction, thereby recording is performed to the optical disc R. FIG. 7 illustrates a space H2 between the recording surface of the optical disc R and the optical member 21. The space H2 is narrower than the space H1 illustrated in FIG. 6, and thus the space H1 is 30 mm or less, more specifically, 10 mm or less.

As described above, the facing section 20 feces a recording surface of a sheet at the discharge areas where the sheet recorded by the recording head 15 is discharged. The facing section 20 includes the optical member 21, which is disposed at a position where the light emitted by the light emitters 23 enters and is disposed to face the recording surface of the sheet such that the incident light travels toward at least the recording surface of the sheet. Accordingly, recording results can be checked immediately, that is, before the recording is completed, and also clearly and visually checked. As a result, user needs can be appropriately satisfied.

In addition, the irradiation area on the recording surface of the sheet irradiated by the optical member 21 has a width that covers the entire recording surface of a first-size sheet, enabling the user to visually check the recording results more appropriately. It should be noted that the first-size sheet according to the embodiment is the A4-size sheet, but is not limited to it. For example, any sheet of a maximum size that can be transported can be used as the first-size sheet, and in such a case, the entire area of the sheet in the width direction can be irradiated.

The optical member 21 according to the embodiment has the optically transparent ground-glass facing surface 21*a* that is disposed to face a recording surface of a sheet. Accordingly, the optical member 21 can diverge the light emitted by the light emitters 23 over a wide area.

As the component to diverge the light emitted by the light emitters 23, instead of the ground-glass facing surface 21*a*, or in addition to the ground-glass facing surface 21*a*, the optical member 21 may contain a light-diffusing agent and has optical transparency. The light-diffusing agent may be barium sulfate, calcium carbonate, silicon oxide, magnesium carbonate, aluminum hydroxide, titanium oxide, zinc oxide, synthetic silica, or glass beads. It should be noted that the component for diverging the light emitted by the light emitters 23 over a wide area is not limited to the component that has the ground-glass facing surface 21*a* or the component that contains a light-diffusing agent.

In addition, in this embodiment, the space between the recording surface and the optical member 21 in the direction orthogonal to the recording surface of the sheet is 30 mm or less, enabling the user to check the recording results clearly visually at the sheet discharge areas. It should be noted that the space between the recording surface and the optical member 21 may be greater than 30 mm when the light quantity to the recording surface is sufficient.

In this embodiment, a pair of reflective sheets 27 are disposed on both sides of the optical path of the light emitted by the light emitters 23 toward the optical member 21. Accordingly, the quantity of light emitted from the optical member 21 toward the recording surface of the sheet can be ensured. The reflective sheets 27 may be omitted when a sufficient quantity of light can be ensured without the reflective sheets 27.

In this embodiment, the shading sheet 28 is disposed between the reflective sheet 27 on the side close to the front panel 19, which functions as a front wall section of the apparatus, and the front panel 19. Accordingly, leakage of light from the front panel 19 toward the apparatus front can be suppressed. The shading sheet 28 may be omitted when the imperviousness to light of the front panel 19 is high and little light leakage is visually observed through the front panel 19 to the outside of the apparatus.

Figure 8:
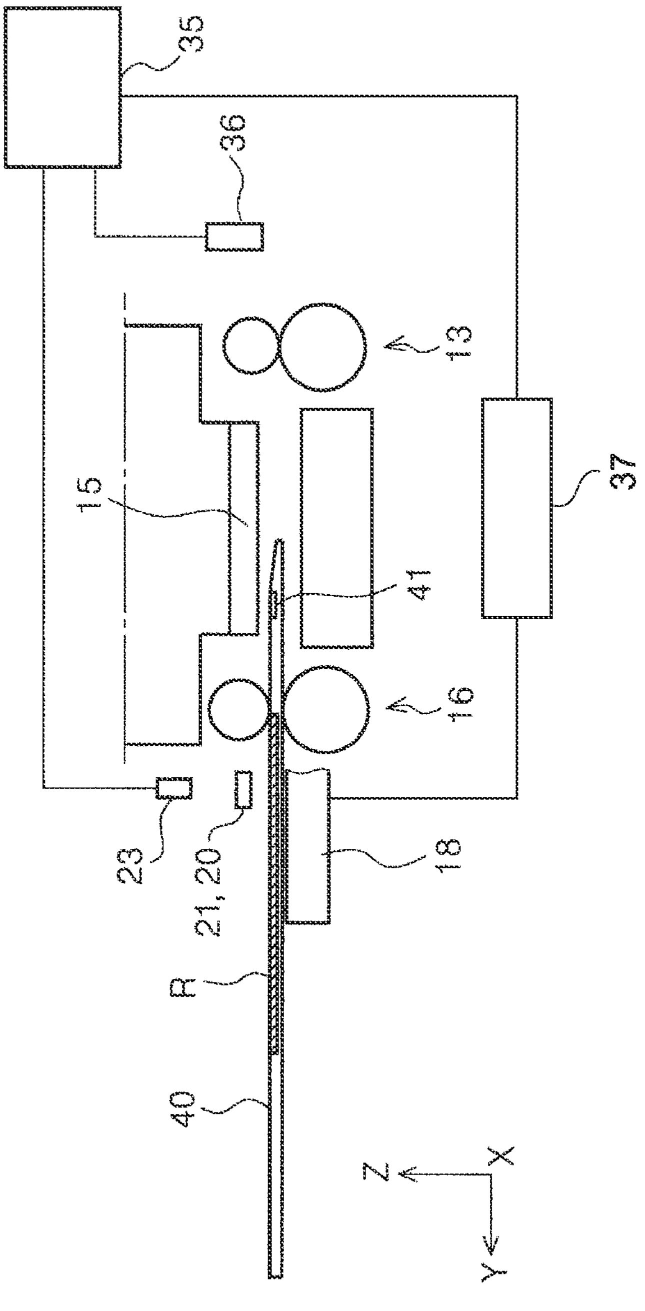
FIG. 8 illustrates a positional relationship between a sheet detector and a reflector in transporting a tray.
Figure 9:
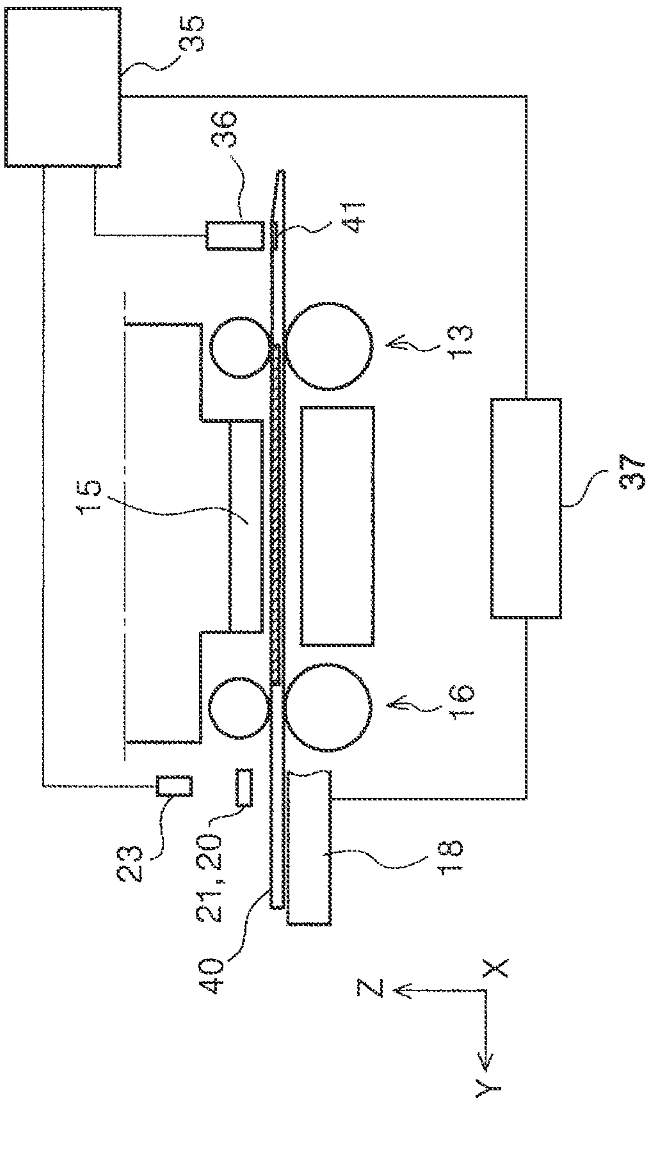
FIG. 9 illustrates a positional relationship between a sheet detector and a reflector in transporting a tray.

A controller 35 (see FIG. 8, FIG. 9) controls the light emission of the light emitters 23 and the recording to sheets. The controller 35 may control the light emitters 23 such that the light emitters 23 light up at least from a time when a leading edge of a sheet reaches a position where the leading edge faces the facing section 20 to a time when a trailing edge of the sheet passes through a position where the trailing edge faces the facing section 20. By the operation, the user can appropriately visually check the entire recording result. The controller 35 can determine a position of a sheet in the sheet transport direction by using a detection signal from a sheet detector 36 (see FIG. 8, FIG. 9), which will be described below. The controller 35 may control the light emitters 23 such that the light emitters 23 start light emission when a print instruction is received, when sheet feeding is started, or when recording is started. The same applies to recording onto an optical disc, which will be described below. In the embodiment, in response to receiving the power of a motor (37), the sheet receiving tray 18 is switched to the retracted state in which the sheet receiving tray 18 is retracted in the apparatus body 2 or the extended state in which the sheet receiving tray 18 is ejected from the apparatus body 2 and extended. Accordingly, the light emitters 23 may start light emission when the switching of the sheet receiving tray 18 from the retracted state to the extended state starts or when the sheet receiving tray 18 has been switched to the extended state. A sensor may be provided to detect presence of a sheet on the sheet receiving tray 18, and the light emission may be ended when the sensor detects that a sheet on the sheet receiving tray 18 is removed.

In addition, the controller 35 may switch between a first recording mode for recording at a first recording quality level to a sheet and a second recording mode for recording at a level higher than the first recording quality level to a sheet. In such a case, the controller 35 may control the light emitters 23 so as not to emit light in the first recording mode and to emit light in the second recording mode. By the control, when the visual check of recording results is not so important, the light emitters 23 emit no light, and thereby power saving can be achieved.

In addition, the controller 35 can perform the following control for the light emitters 23 when the tray 40 on which an optical disc R, which is an example medium, can be set is transported. The sheet detector 36 that changes a detection signal as a leading edge or a trailing edge of a sheet passes through may be disposed upstream the transport roller pair 13 in the sheet transport path. The sheet detector 36 is an example detector, and may be an optical sensor. The entire tray 40 is black and the tray 40 includes a reflector 41 near an end portion in the −Y direction. The tray 40 is inserted in the −Y direction and the reflector 41 reaches the sheet detector 36 as illustrated in a change from FIG. 8 to FIG. 9, and thereby the controller 35 can detect that the tray 40 has been nipped by the transport roller pair 13.

With this structure, based on a detection signal from the sheet detector 36, when the controller 35 detects that the tray 40 has been moved to the position at which the tray 40 can be transported, that is, to the position at which the tray 40 is nipped by the transport roller pair 13, the controller 35 can change the state of the light emitters 23. For example, until the tray 40 reaches the position at which the tray 40 can be transported, the light emitters 23 are turned off, and when the tray 40 reaches the position at which the tray 40 can be transported, the light emitters 23 can be turned on. Alternatively, for example, until the tray 40 reaches the position at which the tray 40 can be transported, the light emitters 23 may be turned on, and when the tray 40 reaches the position at which the tray 40 can be transported, the light emitters 23 can be turned off. By the change in the lighting state of the light emitters 23, the user can understand that the tray 40 has reached the position at which the tray 40 can be transported, and thus the usability of the user can be increased.

Instead of the control, a positioning mark may be provided on the tray 40, and when the positioning mark reaches a position irradiated with the light emitted by the optical member 21, the user may determine that the tray 40 has reached the position at which the tray 40 can be transported.

It is to be understood that the present disclosure is not limited to the above-described embodiments, various modifications can be made within the scope of the following claims, and these modifications are included within the scope of the present disclosure.

What is claimed is:

1. A recording apparatus comprising:

a recording section configured to perform recording onto a medium;

a facing section facing a recording surface of a medium at a discharge area where the medium recorded by the recording section is discharged; and a light emitter disposed on an inside of a front panel configured to emit light toward the recording surface, wherein the facing section includes an optical member disposed at a position where the light emitted by the light emitter enters, the optical member being configured to pass the incident light toward at least the recording surface, wherein the optical member contains a light-diffusing agent and has optical transparency.

2. The recording apparatus according to claim 1, wherein an irradiation area on the recording surface irradiated by the optical member has a width that covers the entire recording surface of a first-size medium in a medium width direction that is a direction orthogonal to a direction in which the medium is transported.

3. The recording apparatus according to claim 1, wherein a space between the recording surface and the optical member in the direction orthogonal to the recording surface is 30 mm or less.

4. The recording apparatus according to claim 1, further comprising:

a pair of reflective sheets disposed on both sides of an optical path of the light emitted by the light emitter toward the optical member.

5. The recording apparatus according to claim 4, further comprising:

a shading sheet disposed between the reflective sheet of the pair of reflective sheets on a side close to a wall of a front of the apparatus and the wall.

6. The recording apparatus according to claim 1, wherein the light emitter lights up at least from a time when a leading edge of the medium reaches a position where the leading edge faces the facing section to a time when a trailing edge of the medium passes through a position where the trailing edge faces the facing section.

7. The recording apparatus according to claim 6, wherein the recording apparatus is configured to be switched between a first recording mode for performing recording to the medium and a second recording mode for performing recording to the medium, and the light emitter emits no light in the first recording mode and emits light in the second recording mode.

8. The recording apparatus according to claim 1, further comprising:

a tray on which a medium is to be set, the tray being configured to be inserted upstream in a medium transport path from an apparatus front; and a detector configured to detect insertion of the tray to a position at which the tray is transported, wherein when the detector detects insertion of the tray to the position at which the tray is transported, the lighting state of the light emitter changes.

9. The recording apparatus according to claim 1, further comprising:

a medium receiving tray configured to be switched by the power of a motor to a retracted state in which the medium receiving tray is retracted in an apparatus body including the recording section or to an extended state in which the medium receiving tray is extended to the maximum from the apparatus body, and configured to receive the medium discharged to the outside of the apparatus body in the extended state or while the medium receiving tray is extended from the apparatus body from the retracted state to the extended state, wherein when the medium receiving tray is moved from the retracted state to the extended state, the light emitter emits light.

10. A recording apparatus comprising:

a recording section configured to perform recording onto a medium;

a facing section facing a recording surface of a medium at a discharge area where the medium recorded by the recording section is discharged;

a light emitter configured to emit light toward the recording surface;

a tray on which a medium is to be set, the tray being configured to be inserted upstream in a medium transport path from an apparatus front; and a detector configured to detect insertion of the tray to a position at which the tray is transported, wherein the facing section includes an optical member disposed at a position where the light emitted by the light emitter enters, the optical member being configured to pass the incident light toward at least the recording surface, and when the detector detects insertion of the tray to the position at which the tray is transported, the lighting state of the light emitter changes.

11. The recording apparatus according to claim 10, wherein an irradiation area on the recording surface irradiated by the optical member has a width that covers the entire recording surface of a first-size medium in a medium width direction that is a direction orthogonal to a direction in which the medium is transported.

12. The recording apparatus according to claim 10, wherein the optical member has an optically transparent ground-glass surface that is disposed to face the recording surface.

13. The recording apparatus according to claim 10, wherein a space between the recording surface and the optical member in the direction orthogonal to the recording surface is 30 mm or less.

14. The recording apparatus according to claim 10, further comprising:

a pair of reflective sheets disposed on both sides of an optical path of the light emitted by the light emitter toward the optical member.

15. The recording apparatus according to claim 14, further comprising:

a shading sheet disposed between the reflective sheet of the pair of reflective sheets on a side close to a wall of a front of the apparatus and the wall.

16. The recording apparatus according to claim 10, wherein the light emitter lights up at least from a time when a leading edge of the medium reaches a position where the leading edge faces the facing section to a time when a trailing edge of the medium passes through a position where the trailing edge faces the facing section.

17. The recording apparatus according to claim 16, wherein the recording apparatus is configured to be switched between a first recording mode for performing recording to the medium and a second recording mode for performing recording to the medium, and the light emitter emits no light in the first recording mode and emits light in the second recording mode.

18. The recording apparatus according to claim 10, wherein the tray is configured to be switched by the power of a motor to a retracted state in which the tray is retracted in an apparatus body including the recording section or to an extended state in which the tray is extended to the maximum from the apparatus body, and configured to receive the medium discharged to the outside of the apparatus body in the extended state or while the tray is extended from the apparatus body from the retracted state to the extended state, wherein when the tray is moved from the retracted state to the extended state, the light emitter emits light.

* * * * *